(12) United States Patent
Kröhnke

(10) Patent No.: US 6,995,200 B2
(45) Date of Patent: Feb. 7, 2006

(54) COLOR IMPROVING STABILIZING COMPOSITIONS COMPRISING LEUCINE

(75) Inventor: Christoph Kröhnke, Breisach (DE)

(73) Assignee: Clariant Finance (BVI) Limited, Tortola (VG)

( * ) Notice: Subject to any disclaimer, the term of this patent is extended or adjusted under 35 U.S.C. 154(b) by 69 days.

(21) Appl. No.: 10/468,474

(22) PCT Filed: Feb. 20, 2002

(86) PCT No.: PCT/IB02/00521

§ 371 (c)(1),
(2), (4) Date: Aug. 20, 2003

(87) PCT Pub. No.: WO02/066551

PCT Pub. Date: Aug. 29, 2002

(65) Prior Publication Data

US 2004/0072932 A1   Apr. 15, 2004

(30) Foreign Application Priority Data

Feb. 22, 2001  (GB) .................................. 0104371

(51) Int. Cl.
*C08K 5/09*     (2006.01)
*C08K 5/136*    (2006.01)
*C08K 5/526*    (2006.01)
*C08K 5/5333*   (2006.01)

(52) U.S. Cl. ....................... 524/128; 524/126; 524/147; 524/151; 524/153; 524/251; 524/300; 252/400.24; 252/403; 252/404; 252/405

(58) Field of Classification Search ................ 524/198, 524/251, 147, 126, 128, 151, 153, 300; 252/400.24, 252/403–405
See application file for complete search history.

(56) References Cited

U.S. PATENT DOCUMENTS

| | | | |
|---|---|---|---|
| 3,904,579 A * | 9/1975 | Braddicks .................... 524/351 |
| 4,325,863 A | 4/1982 | Hinsken et al. |
| 4,338,244 A | 7/1982 | Hinsken et al. |
| 4,675,356 A * | 6/1987 | Miyata ........................ 524/424 |
| 5,126,052 A | 6/1992 | Lane et al. |
| 5,169,925 A | 12/1992 | Schmailzl et al. |
| 5,175,312 A | 12/1992 | Dubs et al. |
| 5,252,643 A | 10/1993 | Nesvadba |
| 5,356,966 A | 10/1994 | Nesvadba |
| 5,367,008 A | 11/1994 | Nesvadba |
| 5,369,159 A | 11/1994 | Nesvadba |
| 5,384,346 A | 1/1995 | Gutweiler et al. |
| 5,428,162 A | 6/1995 | Nesvadba |
| 5,428,177 A | 6/1995 | Nesvadba |
| 5,616,636 A | 4/1997 | Avar et al. .................. 524/102 |
| 5,679,733 A | 10/1997 | Malik et al. |
| 5,919,933 A | 7/1999 | Gaa et al. |
| 5,969,014 A | 10/1999 | Webster et al. ............. 524/100 |
| 5,985,691 A | 11/1999 | Basol et al. |
| 6,063,843 A | 5/2000 | Sidqi et al. |
| 6,103,796 A | 8/2000 | Staniek et al. ............. 524/100 |
| 6,126,861 A | 10/2000 | Bechtold |
| 6,172,232 B1 | 1/2001 | Stahrfeldt |
| 6,174,940 B1 | 1/2001 | Stahrfeldt et al. |
| 6,225,385 B1 | 5/2001 | Stahrfeldt et al. .......... 524/119 |
| 6,306,494 B1 * | 10/2001 | Takahashi et al. .......... 428/328 |
| 6,593,485 B1 | 7/2003 | Stoll et al. .................... 558/71 |
| 6,787,591 B2 | 9/2004 | Koch et al. |

FOREIGN PATENT DOCUMENTS

| | | |
|---|---|---|
| DE | 43 16 611 | 11/1993 |
| DE | 43 16 622 | 11/1993 |
| DE | 43 16 876 | 11/1993 |
| DE | 196 37 181 | 3/1997 |
| EP | 0 336 264 | 10/1989 |
| EP | 0 407 139 | 1/1991 |
| EP | 0 589 839 | 3/1994 |
| WO | WO 97/49758 | 12/1997 |

OTHER PUBLICATIONS

T.J. Henman in "Development in Polymer Stabilization", Part 1, ed. G.Scott, Appl. Sci. Publ. Ltd., London, p. 39 (1979).
English abstract for DE 19637181, Mar. 20, 1997.

* cited by examiner

*Primary Examiner*—Peter Szekely
(74) *Attorney, Agent, or Firm*—Anthony A. Bisulca

(57) ABSTRACT

The present invention relates to a stabilizer composition comprising
  a) at least one sterically hindered phenol,
  b) at least one phosphorus-containing secondary antioxidant, and
  c) at least one Leucine compound,
wherein the weight ratio of component (a) to component (b) to component (c) is from 1:5:3 to 1:0,5:0,1 for the stabilization of polyolefine-based thermoplastic polymers against degradation, crosslinking and/or discoloration due to the exposure to heat and/or light, especially in the presence of oxygen.

14 Claims, No Drawings

COLOR IMPROVING STABILIZING COMPOSITIONS COMPRISING LEUCINE

The invention relates to color improving stabilizing compositions comprising Leucine for processing of polyolefine-based thermoplastic polymers.

During processing into articles, thermoplastic polymers are subjected to high temperatures and pressures which can have an adverse effect on the molecular weight and physical properties of the polymers and on the appearance of the finished articles made from these polymers. Therefore, there is a need for antioxidant and color stabilizing additives which minimize oxidation and discoloration.

Common stabilizer systems consist of organophosphites and -phosphonites and sterically hindered phenolic antioxidants and/or optionally amines, which are able to prevent or to retard deleterious processes.

Degradation processes go along with varying structural features within the polymer such as the formation of conjugated functionalities consisting of conjugated vinylidene- and carbonyl groups. Moreover, discoloration of polymers containing sterically hindered phenolic antioxidants are affected by colored transformation products of these additives containing quinoid structures. [References: P. P. Klemchuk and P.-L. Horng, Polym. Degr. Stab., 7, 131 (1984); T. J. Herman in "Development in Polymer Stabilization", Part 1, ed. G. Scott, Appl. Sci. Publ. Ltd., London, page 39 (1979); J. Scheirs, S. W. Bigger and O. Delatycki, Polymer 30, 2080 (1989)]. Its extent depends on structure and consumption of phenols. Discoloration of polyolefins is particularly pronounced by continuous contact with water or $NO_x$-gases. A further origin of color is discussed to be redox-reactions and/or complex-formation of metal residues-deriving from catalysts used for the polymer-manufacture—with stabilizers or transition products of stabilizers.

Despite the fact that suitable combinations of organophosphites and/or -phosphonites with sterically hindered phenols can improve discoloration effects, the problem should be further reduced in order to fulfill technological requirements.

It is the object of the present invention to provide an improved stabilizer composition for the stabilization of polyolefine-based thermoplastic polymers, such that color stability of the final products is improved.

This object is achieved with the stabilizer composition as hereinunder described. It has surprisingly been found that relatively small additions of aminoacids, particularly of Leucine, to known additive systems result in an unexpected synergistic effect and lead to an effective stabilization of polyolefine-based thermoplastic polymers against discoloration due to the exposure to heat or light, especially in the presence of oxygen. This stabilizer composition according to the invention comprising at least one member of three known additive classes significantly outperforms the additive systems that are known in the art.

Accordingly, the present invention provides a color improving stabilizer composition for polyolefine-based thermoplastic polymers comprising a) at least one sterically hindered phenol,
b) at least one phosphorous-containing secondary antioxidant, and
c) at least one Leucine compound, wherein the weight ratio of component (a) to component (b) to component (c) is from 1:5:3 to 2:0,5:0,1, preferably from 1:3:2 to 1:1:0,2.

If in the stabilizer composition according to the present invention more than one compound of component (a), (b) or (c) is present, the definition of the weight ratios always refers to the total amount of component (a), (b) or (c). The term "Leucine compound" refers to any compound having the basic Leucine structure.

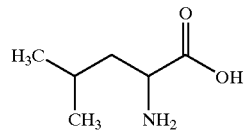

Disclosed are also compounds with variations of the chemical structure of Leucine such as its isomer iso-Leucine Environmentally friendly, GRAS-listed compounds (GRAS=generally regarded as safe), particularly Leucine, are able to act in small concentrations as color improving compounds during melt processing of polyolefins. This ability denotes a generally significant technical improvement for processing of a variety of polyolefins.

Compared with other aminoacids such as methionine, cystine and cysteine, which contribute to melt stabilization processes, Leucine exhibits, if at all, a much lower efficiency in melt stabilization, but a distinct color improving effect.

As used herein, the term "sterically hindered phenol" refers to those compounds that are preferably derived from 2,6-di-tert.-butyl-phenol, 2-tert.-butyl-6-methylphenol, 2-tert.-butyl-5-methylphenol or other hindered phenols.

Preferred examples of such compounds are 2,2'-bis[3,5-[3,5-bis(1,1-dimethylethyl)-4-hydroxyphenyl]-1-oxopropoxy]methyl-1,3-propanediyl-3,5-bis(1,1-dimethylethyl)-4-hydroxybenzenepropanoate; octadecyl-3,5-bis(1,1-dimethylethyl)-4-hydroxybenzene-propanoate; 1,3,5-tris[[3,5-bis(1,1-dimethylethyl)-4-hydroxyphenyl]methyl]-1,3,5-tri-azine-2,4,6(1H,3H,5H)-trione; 4,4', 4"-[2,4,6-trimethyl-1,3,5-benzenetriyl)tris-(methylene)]tris[2,6-bis(1,1-dimethylethyl)-phenol; ethanediyl-3,5-bis(1,1-dimethylethyl)-4-hydroxy-thiodi-2,1-benzenepropanoate; 2:1 calcium salt of monoethyl-[[3,5-bis(1,1-dimethylethyl)-4-hydroxyphenyl]methyl]-phosphonic acid ester; 2-[3-[3,5-bis-(1,1-dimethylethyl)-4-hydroxy-phenyl]-1-oxo-propyl] hydrazide-3,5-bis(1,1-dimethyl-ethyl)-4-hydroxy-benzenepropanoic acid; 2,2'-oxamido-bis-[ethyl-3-(3,5-di-tert.butyl-4-hydroxyphenyl)propionate]or mixtures thereof.

As also used herein, the term "phosphorus-containing secondary antioxidant" refers to compounds being hydroperoxide decomposers, i.e. compounds having the ability to react with hydroperoxides to yield non-radical products, essentially decomposing hydroperoxides into stable by-products. Examples of such compounds are triesters of phosphorous acid (phosphites) and diesters of phosphorous acid (phosphonites).

Preferred specific members of the phosphorus-containing secondary antioxidants are triphenylphosphite, tris-isodecylphosphite; tris(nonylphenyl)phosphite; distearyl pentaerythritol diphosphite; 2,4,6-tri-tert.-butyl-phenyl-2-butyl-2-ethyl-1,3-propanediol phosphite; bis(2,4-di-tert.-butylphenyl)-pentaerythrityl diphosphite; 2,2',2"-nitrilo triethyl-tris-[3,3',5,5'-tetra-tert.-butyl-1,1'-biphenyl-2,2'-diyl]phosphite; bis[2,4-di-tert.-butyl-6-methyl-phenyl]ethyl phosphite; 2,2'-ethylidene-bis-(4,6-di-tert.-butylphenyl)-fluorophosphite: tris-(2,4-di-tert.-butylphenyl)phosphite; the 4,6-di-tert.-butyl-m-cresol condensation products with the Friedel-Crafts-reaction products of biphenyl and phosphorus trichloride; tetrakis [2,4-di-tert.-butylphenyl]-4.4'-biphenylene-diphosphonite; the condensation products of 2,4-di-tert.-butylphenol with the Friedel-Crafts-reaction product of biphenyl and $PCl_3$.

Suitable polyolefin-based thermoplastic polymers to be stabilized according to the instant invention are for example the following ones:

1. Polymers of monoolefins and diolefins, for example polypropylene, polyisobutylene, polybut-1-ene, poly4-methylpent-1-ene, polyisoprene or polybutadiene, as well as polymers of cycloolefins, for example of cyclopentene or norbornene; furthermore polyethylene (which optionally can be crosslinked); for example, high density polyethylene (HDPE), polyethylene of high density and high molar mass (HDPE-HMW), polyethylene of high density and ultrahigh molar mass (HDPE-UHMW), medium density polyethylene (HMDPE), low density polyethylene (LDPE), linear low density polyethylene (LLDPE), branched low density polyethylene (BLDPE).
2. Mixtures of the polymers mentioned under 1), for example mixtures of polypropylene with polyisobutylene, polyethylene with polyisobutylene, polypropylene with polyethylene (for example PP/HDPE/LDPE) and mixtures of different types of polyethylene (for example LDPE/HDPE) with one another.
3. Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide or ethylene-acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned under 1), for example polypropylene-ethylene-propylene copolymers, LDPE-ethylene-vinyl acetate copolymers, LDPE-ethylene-acrylic acid copolymers, LLDPE-ethylene-vinyl acetate copolymers, LLDPE-ethylene-acrylic acid copolymers and alternating or random polyalkylene-carbon monoxide copolymers and mixtures thereof with other polymers, for example polyamides.

The phosphites and phosphonites as well as the sterically hindered phenols disclosed above can be synthesized by techniques well known in the art from known compounds. They are commercially available. A selection of compounds including their tradenames as well as their chemical structural formulae are listed in table 1.

The stabilizer composition of the present invention may be produced by simple physical mixing of the compounds (a), (b) and (c) in the desired weight ratio according to known methods. A preferred method is the dry blending of the components resulting in a free-flowing mixture which may be further subjected to a pre-extrusion step in order to achieve homogeneity and easy-to-handle pellets. The process for producing the stabilizer composition is a further aspect of the present invention.

A masterbatch composition comprising a stabilizer composition according to the invention and a thermoplastic material which is identical to or compatible with the thermoplastic polymer to be stabilized is similarly an object of the invention. Masterbatch compositions according to the invention comprise 10 to 80% by weight, preferably 5 to 25% by weight of the stabilizer composition and 90% to 20% by weight, preferably 95 to 75% by weight of the afore-mentioned thermoplastic material.

The invention also provides a method for enhancing the color stability of polyolefine-based thermoplastic polymers comprising—incorporating therein at any convenient state of the processing—a stabilizing quantity of the stabilizer composition. This can be carried out according to known methods and may involve the incorporation of the stabilizer composition as such or in the form of the above-mentioned masterbatch. Also, the individual components can be incorporated separately in the correct ratio.

The concentration of the stabilizer composition amounts from 0.001 to 5%, preferably from 0.01 to 1%, more preferably from 0.1 to 0.5% by weight, based on the weight of the polyolefine-based thermoplastic polymers to be stabilized.

The present invention further embraces a stabilized polyolefine-based thermoplastic polymer and any article manufactured therefrom that has been stabilized by the incorporation therein a stabilizing quantity of the stabilizer composition according to the present invention.

The polymer can contain other components such as organophosphanes, benzofura-none-based processing stabilizers, polyphenols and/or hydroxychroman-derivatives, other aminoacid-based stabilizers, sterically hindered piperidine-based light-and heat-stabilizers (HA[L]S), optical brighteners, UV absorbers, U.V. quenchers, acid scavengers, metal desactivators, nucleating agents, fillers, antistatic agents, plasticizers, lubricants, dyes, pigments, emulsifiers, flame retardants, blowing agents, crosslinking agents, antiblocking agents, slip agents, thiosynergists and processing aids.

The invention relates also to those of the mentioned additives, which are used in form of nano-sized particles.

TABLE 1

Trade names, chemical names and chemical structural formulae of the individual components of the stabilizer composition used in the examples.

Hostanox ® O10 (Clariant)
tetrakismethylene(3,5-di-tert.butyl-4-hydroxyphenyl)hydrocinnamate

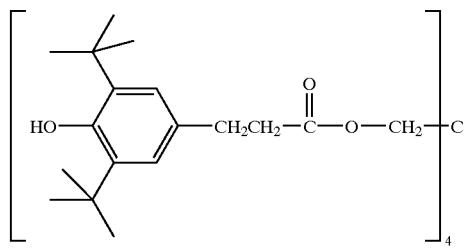

TABLE 1-continued

Trade names, chemical names and chemical structural formulae of the individual components of the stabilizer composition used in the examples.

Hostanox ® 016 (Clariant)
octadecyl-3,5-bis(1,1-dimethylethyl)-4-hydroxybenzenepropanoate

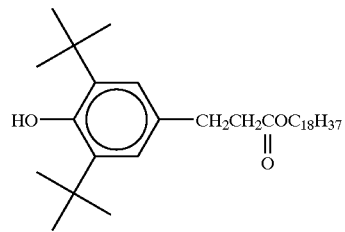

Hostanox ® PAR 24 (Clariant)
tris(2,4-di-tert.-butylphenyl)phosphite

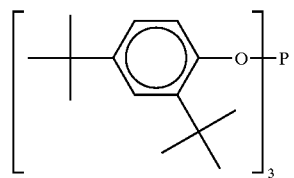

Sandostab ® P-EPQ (Clariant)
Composed of
1) 50–80 parts of tetrakis(2,4-di-tert.-butylphenyl)-biphenylene-diphosphonite

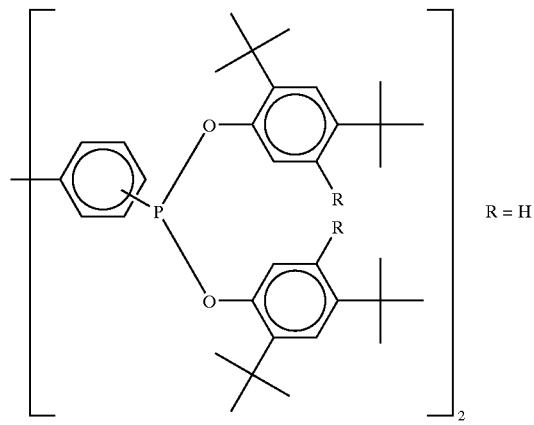

R = H 2) 10–25 parts of bis(2,4-di-tert.-butylphenyl)biphenylene-monophosphonite
3) 10–25 parts of tris(2,4-di-tert.-butylphenyl)phosphite
   Ultranox 626 (General Electric)
   bis(2,4-di-tert-butylphenyl)-pentaerythritol-diphosphite

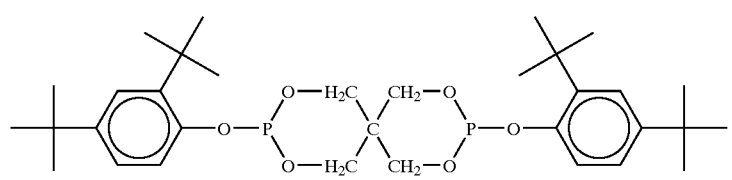

The following non limiting examples shall demonstrate the instant invention in more detail.

EXAMPLES

Processing of Polyethylene-LLD 100 parts by weight of low linear density polyethylene (PE-LLD), type F-30 FG-N, producer Mitsubishi (internal code LL 96-2) [MFI: 0.9 g/10 min/190° C./2.16 kg] has been mixed in a laboratory mixer from Kenwood adding 0.03 parts by weight of Hostanox O 16, 0.05 parts by weight of Zn-stearate, 0.04 parts by weight of Sandostab P-EPQ and 0.01 parts by weight of D,L-Leucine. Afterwards pre-extrusion was carried out using a single screw extruder type Collin (screw compression 1:3, die diameter 3 mm, screw speed 80 rpm) at 210° C. The main extrusions ($1^{st}$–$5^{th}$) took place using a single screw extruder type Göttffert Extrusimeter (screw-compression 1:3, 70 rpm, die-diameter 4 mm) with 4 heating zones each at T=240° C. Color has been measured according to DIN 6167 using a Minolta spectro-colorimeter. The corresponding color-results are listed in the following table 2. YI stands for Yellowness Index and measures the technically undesired yellowing, a low number indicates high color stability. The number after YI defines the number of extrusion passes.

Results received according to this procedure are shown in the tables 2–4. All numbers referring to the amount of stabilizing compounds are parts by weight.

TABLE 2

Color (YI) data

| stabilizer formulation (base stabilization: 0.03 Hostanox O16; 0.05 Zn-stearate) | $1^{st}$ pass | $3^{rd}$ pass | $5^{th}$ pass |
|---|---|---|---|
| 0.04 Sandostab P-EPQ (reference 1) | 1.75 | 2.56 | 2.78 |
| 0.05 Sandostab P-EPQ (reference 2) | 1.63 | 2.20 | 2.44 |
| 0.07 Sandostab P-EPQ (reference 3) | 1.46 | 2.64 | 2.34 |
| 0.04 Sandostab P-EPQ + 0.01 D,L-Leucine | 0.52 | 1.18 | 1.77 |

TABLE 3

Processing of PE-LLD by multiple pass extrusion at T = 220° C.

| stabilizer concentration | STABILIZER | Yellowness Index | | | |
|---|---|---|---|---|---|
| 0.05000 | ZINC STEARATE | | | | |
| 0.03000 | HOSTANOX 016 | YI0 | YI1 | YI3 | YI5 |
| 0.05000 | SANDOSTAB P-EPQ ref. | −1.08 | −0.65 | 2.04 | 4.40 |
| 0.0500 | ZINC STEARATE | | | | |
| 0.0300 | HOSTANOX 016 | YI0 | YI1 | YI3 | YI5 |
| 0.0800 | SANDOSTAB P-EPQ ref. | −1.56 | −0.40 | 1.95 | 3.04 |
| 0.0500 | ZINC STEARATE | | | | |
| 0.0300 | HOSTANOX 016 | | | | |
| 0.0450 | SANDOSTAB P-EPQ ref. | YI0 | YI1 | YI3 | YI5 |
| 0.0050 | DL-LEUCINE | −1.29 | −0.80 | 1.06 | 1.84 |
| 0.0500 | ZINC STEARATE | | | | |
| 0.0300 | HOSTANOX 016 | | | | |
| 0.0400 | SANDOSTAB P-EPQ ref. | YI0 | YI1 | YI3 | YI5 |
| 0.0050 | DL-LEUCINE | −1.15 | −1.53 | 1.17 | 4.63 |
| 0.0050 | DL-ALPHA-TOCOPHEROL E 307 | | | | |
| 0.0500 | ZINC STEARATE | | | | |
| 0.0300 | HOSTANOX 016 | | | | |
| 0.0400 | SANDOSTAB P-EPQ ref. | YI0 | YI1 | YI3 | YI5 |
| 0.0025 | DL-LEUCINE | −0.28 | −0.67 | 1.82 | 4.83 |
| 0.0075 | DL-ALPHA-TOCOPHEROL E 307 | | | | |
| 0.0500 | ZINC STEARATE | | | | |
| 0.0300 | HOSTANOX 016 | | | | |
| 0.0400 | SANDOSTAB P-EPQ ref. | YI0 | YI1 | YI3 | YI5 |
| 0.0075 | DL-LEUCINE | −1.16 | −1.37 | 0.95 | 4.04 |
| 0.0025 | DL-ALPHA-TOCOPHEROL E 307 | | | | |

TABLE 4

Processing of PE-LLD by multiple pass extrusion at T = 220° C.

| stabilizer concentration | STABILIZER | Yellowness Index | | | |
|---|---|---|---|---|---|
| 0.0500 | ZINC STEARATE | | | | |
| 0.0300 | HOSTANOX 016 | YI0 | YI1 | YI3 | YI5 |
| 0.0500 | SANDOSTAB P-EPQ ref. | −1.06 | 0.55 | 3.44 | 4.87 |
| 0.0500 | ZINC STEARATE | | | | |
| 0.0300 | HOSTANOX 016 | | | | |
| 0.0400 | SANDOSTAB P-EPQ ref. | | | | |
| 0.0025 | TEA POLYPHENOL LIGHT GREEN | YI0 | YI1 | YI3 | YI5 |
| 0.0075 | DL-LEUCINE | −0.19 | 0.58 | 1.92 | 2.91 |
| 0.0500 | ZINC STEARATE | | | | |
| 0.0300 | HOSTANOX 016 | | | | |
| 0.0400 | SANDOSTAB P-EPQ ref. | | | | |
| 0.0050 | TEA POLYPHENOL LIGHT GREEN | YI0 | YI1 | YI3 | YI5 |
| 0.0050 | DL-LEUCINE | 3.49 | 3.09 | 4.02 | 4.58 |
| 0.0500 | ZINC STEARATE | | | | |
| 0.0300 | HOSTANOX 016 | | | | |
| 0.0400 | SANDOSTAB P-EPQ ref. | | | | |
| 0.0075 | TEA POLYPHENOL LIGHT GREEN | YI0 | YI1 | YI3 | YI5 |
| 0.0025 | DL-LEUCINE | 8.78 | 9.65 | 8.86 | 9.13 |

The addition of Leucine clearly improves the color stability. Even in a less color stable system where Sandostab P-EPQ partially has been replaced by α-tocopherol or by tea polyphenol light green (natural polyphenols gained from herbal extracts, like extracts from green tea), increasing the amount of Leucine still leads to an improvement of color stability.

Processing Of Polypropylene 100 parts by weight of polypropylene (PP), type Eltex P, producer Solvay (internal code PP 99-10) [MFI: 3.3 g/10 min/230° C./2.16 kg] has been mixed in a laboratory mixer from Kenwood adding 0.05 parts by weight of Hostanox O 10, 0.05 parts by weight of Ca-stearate, 0.05 parts by weight of Sandostab P-EPQ and 0.01 parts by weight of D,L-Leucine. Alternatively used as phosphorous-based processing are 0.5 parts by weight Ultranox 626 or alternatively 0.025 parts Sandostab P-EPQ together with 0.025 parts Hostanox PAR 24 or alternatively 0.0225 parts Sandostab P-EPQ together with 0.0225 parts Hostanox PAR 24 and together with 0.005 parts α-tocopherol. Afterwards pre-extrusion was carried out using a single screw extruder type Haendle KPS 25 (screw compression 1:3, die diameter 4 mm, screw speed 80 rpm) at 220° C. The main extrusions ($1^{st}$–$5^{th}$) took place using a single screw extruder type Göttfert Extrusimeter (screw-compression 1:3, 50 rpm, die-diameter 2 mm) with 4 heating zones each at T=240° C. or alternatively at T=270° C. or alternatively at 300° C. Color has been measured according to DIN 6167 using a Minolta spectrocolorimeter. A selection of corresponding color-results is listed in the following tables 5 A–C.

TABLE 5 A

Processing of polypropylene by multiple pass extrusion at T = 240° C.

| stabilizer conc. | STABILIZER | Yellowness Index | | | |
|---|---|---|---|---|---|
| 0.1000 | CALCIUM STEARATE DW | | | | |
| 0.0500 | HOSTANOX O 10 | | | | |
| 0.0225 | SANDOSTAB P-EPQ ref. | | | | |
| 0.0225 | Hostanox PAR 24 Blend | YI0 | YI1 | YI3 | YI5 |
| 0.0050 | α-tocopherol | 3.27 | 5.32 | 11.29 | 15.30 |
| 0.1000 | CALCIUM STEARATE DW | | | | |
| 0.0500 | HOSTANOX O 10 | | | | |
| 0.0225 | SANDOSTAB P-EPQ ref. | | | | |
| 0.0225 | Hostanox PAR 24 Blend | | | | |
| 0.0050 | α-tocopherol | YI0 | YI1 | YI3 | YI5 |
| 0.0100 | DL-LEUCINE | 2.08 | 2.58 | 7.45 | 13.08 |
| 0.1000 | CALCIUM STEARATE DW | | | | |
| 0.0500 | HOSTANOX O 10 | | | | |
| 0.0450 | Ultranox 626 | YI0 | YI1 | YI3 | YI5 |
| 0.0050 | α-tocopherol | 2.03 | 2.53 | 5.23 | 10.22 |
| 0.1000 | CALCIUM STEARATE DW | | | | |
| 0.0500 | HOSTANOX O 10 | | | | |
| 0.0450 | Ultranox 626 | | | | |
| 0.0050 | α-tocopherol | YI0 | YI1 | YI3 | YI5 |
| 0.0100 | DL-Leucine | 1.24 | 1.74 | 4.83 | 8.02 |

TABLE 5 B

Processing of polypropylene by multiple pass extrusion at T = 270° C.

| stabilizer concentration | STABILIZER | Yellowness Index | | | |
|---|---|---|---|---|---|
| 0.1000 | CALCIUM STEARATE DW | | | | |
| 0.0500 | HOSTANOX O 10 | | | | |
| 0.0225 | SANDOSTAB P-EPQ ref. | | | | |
| 0.0225 | Hostanox PAR 24 | YI0 | YI1 | YI3 | YI5 |
| 0.0050 | α-tocopherol | 3.27 | 5.00 | 9.52 | 15.47 |
| 0.1000 | CALCIUM STEARATE DW | | | | |
| 0.0500 | HOSTANOX O 10 | | | | |
| 0.0225 | SANDOSTAB P-EPQ ref. | | | | |
| 0.0225 | Hostanox PAR 24 | | | | |
| 0.0050 | α-tocopherol | YI0 | YI1 | YI3 | YI5 |
| 0.0100 | DL-LEUCINE | 2.15 | 3.11 | 8.85 | 12.54 |
| 0.1000 | CALCIUM STEARATE DW | | | | |
| 0.0500 | HOSTANOX O 10 | | | | |
| 0.0450 | Ultranox 626 | YI0 | YI1 | YI3 | YI5 |
| 0.0050 | α-tocopherol | 2.11 | 5.20 | 9.85 | 13.40 |
| 0.1000 | CALCIUM STEARATE DW | | | | |
| 0.0500 | HOSTANOX O 10 | | | | |
| 0.0450 | Ultranox 626 | | | | |
| 0.0050 | α-tocopherol | YI0 | YI1 | YI3 | YI5 |
| 0.0100 | DL-Leucine | 1.44 | 2.45 | 7.18 | 12.91 |

TABLE 5 C

Processing of polypropylene by multiple pass extrusion at T = 300° C.

| stabilizer concentration | STABILIZER | Yellowness Index | | | |
|---|---|---|---|---|---|
| 0.1000 | CALCIUM STEARATE DW | | | | |
| 0.0500 | HOSTANOX O 10 | | | | |
| 0.0225 | SANDOSTAB P-EPQ ref. | | | | |
| 0.0225 | Hostanox PAR 24 | YI0 | YI1 | YI3 | YI5 |
| 0.0050 | α-tocopherol | 2.91 | 4.91 | 9.70 | 13.14 |
| 0.1000 | CALCIUM STEARATE DW | | | | |
| 0.0500 | HOSTANOX O 10 | | | | |

TABLE 5 C-continued

Processing of polypropylene by multiple pass extrusion at T = 300° C.

| stabilizer concentration | STABILIZER | Yellowness Index | | | |
|---|---|---|---|---|---|
| 0.0225 | SANDOSTAB P-EPQ ref. | | | | |
| 0.0225 | Hostanox PAR 24 | | | | |
| 0.0050 | α-tocopherol | YI0 | YI1 | YI3 | YI5 |
| 0.0100 | DL-LEUCINE | 1.82 | 3.28 | 7.23 | 10.25 |
| 0.1000 | CALCIUM STEARATE DW | | | | |
| 0.0500 | HOSTANOX O 10 | | | | |
| 0.0450 | Ultranox 626 | YI0 | YI1 | YI3 | YI5 |
| 0.0050 | α-tocopherol | 2.51 | 5.00 | 10.76 | 14.55 |
| 0.1000 | CALCIUM STEARATE DW | | | | |
| .0500 | HOSTANOX O 10 | | | | |
| 0.0450 | Ultranox 626 | | | | |
| 0.0050 | α-tocopherol | YI0 | YI1 | YI3 | YI5 |
| 0.0100 | DL-Leucine | 1.10 | 2.02 | 6.88 | 12.40 |

The results clearly show that also in polypropylene the instant stabilizer composition leads to significantly improved color stability.

What is claimed is:

1. A color improving stabilizer composition for polyolefin-based thermoplastic polymers comprising
   a) at least one sterically hindered phenol,
   b) at least one phosphorus-containing secondary antioxidant, and
   c) at least one Leucine compound,
   wherein the weight ratio of component (a) to component (b) to component (c) is from 1:5:3 to 2:0.5:0.1.

2. A composition according to claim 1 wherein the weight ratio of component (a) to component (b) to component (c) is from 1:3:2 to 1:1:0.2.

3. A composition according to claim 1 wherein the Leucine compound is Leucine.

4. A composition according to any claim 1, wherein the sterically hindered phenol is 2,2'-bis[3,5-[3,5-bis(1,1-dimethylethyl)-4-hydroxyphenyl]-1-oxoprop-oxy]methyl-1,3-propanediyl-3,5-bis(1,1-dimethylethyl)-4-hydroxybenzenepro-panoate; octadecyl-3,5-bis(1,1-dimethylethyl)-4-hydroxybenzenepropanoate; 1,3,5-tris[[3,5-bis(1,1-dimethylethyl)-4-hydroxyphenyl]methyl]1,3,5,-triazine-2,4,6(1H,3H,5H)trione; 4,4',4"-[2,4,6-trimethyl-1,3,5-benzenetriyl)tris-(methylene)-]tris[2,6-bis(1,1-dimethylethyl)-phenol; ethanediyl-3,5-bis(1,1-dimethylethyl)-4-hydroxy-thiodi-2,1-benzenepropanoate; 2:1 calcium salt of monoethyl-[[3,5-bis-(1,1-dimethylethyl)-4-hydroxyphenyl]-methyl]-phosphonic acid ester; 2-[3-[3,5-bis(1,1-dimethylethyl)-4-hydroxy-phenyl]-1-oxopropyl]-hydrazide-3,5-bis(1,1 -dimethylethyl)-4-hydroxy-benzenepropanoic acid; 2,2'-oxamido-bis-[ethyl-3-(3,5-di-tert.-butyl-4-hydroxyphenyl)-propionate] or mixtures thereof.

5. A composition according to claim 1, wherein the phosphorous-containing secondary antioxidant is triphenylphosphite, tris-isodecylphosphite; tris(nonylphenyl) phosphite; distearyl pentaerythritol diphosphite; 2,4,6-tri-tert.-butylphenyl-2-butyl-2-ethyl-1,3-propanediol phosphite; bis(2,4-di-tert.-butyl-phenyl)-pentaerythrityl diphosphite; 2,2',2"-nitrilo triethyl-tris[3,3',5,5'-tetra-tert.-butyl-1,1'-biphenyl-2,2'-diyl]phosphite; bis[2,4-di-tert.-butyl-6-methyl-phenyl]ethyl phosphite; 2,2'-ethylidene-bis-(4,6-di-tert.-butylphenyl)-fluorophosphite; tris(2,4-di-tert.-butylphenyl)phosphite; the 4,6-di-tert.-butyl-m-cresol condensation products with the Friedel-Crafts-reaction products of biphenyl and phosphorous trichloride; tetrakis

[2,4-di-tert.-butylphenyl]-4,4'-biphenylenediphosphonite; or the condensation products of 2,4-di-tert.-butylphenol with the Friedel-Crafts-reaction product of biphenyl and PCl$_3$.

6. A method for enhancing the color stability of polyolefin-based thermoplastic polymers comprising the step of incorporating into the polyolefin-based thermoplastic polymer, before or during processing, a stabilizing quantity of the stabilizer composition according to claim 1.

7. A method according to claim 6 wherein the stabilizer composition is added in an amount of from 0.001 to 5% by weight, based on the thermoplastic polymer.

8. A process for producing a stabilizer composition according to claim 1, comprising mixing the components (a), (b) and (c) in the weight ratios given in claim 1.

9. A masterbatch composition comprising a stabilizer composition according to claim 1 and a thermoplastic material, wherein the thermoplastic material is identical or compatible with a thermoplastic polymer to be stabilized.

10. A masterbatch composition according to claim 9 comprising 10 to 80% by weight of the stabilizer composition and 90 to 20% by weight of the thermoplastic material.

11. A method according to claim 6, wherein the stabilizer composition is added in an amount from 0.01 to 1% by weight, based on the thermoplastic polymer.

12. A method according to claim 6, wherein the stabilizer composition is added in an amount from 0.1 to 0.5% by weight, based on the thermoplastic polymer.

13. A masterbatch composition according to claim 9, comprising 5 to 25% by weight of the stabilizer composition and 95 to 75% by weight of the thermoplastic material.

14. A thermoplastic article comprising the stabilizer composition of claim 1.

\* \* \* \* \*